US009864651B2

United States Patent
Liu et al.

(10) Patent No.: US 9,864,651 B2
(45) Date of Patent: *Jan. 9, 2018

(54) RECEIVING AN UPDATE CODE PRIOR TO COMPLETION OF A BOOT PROCEDURE

(71) Applicant: HEWLETT-PACKARD DEVELOPMENT COMPANY, L.P., Houston, TX (US)

(72) Inventors: Jon Liu, Houston, TX (US); Valiuddin Y. Ali, Cypress, TX (US); Lan Wang, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/204,679

(22) Filed: Jul. 7, 2016

(65) Prior Publication Data

US 2016/0321132 A1    Nov. 3, 2016

Related U.S. Application Data

(63) Continuation of application No. 14/391,427, filed as application No. PCT/US2012/047978 on Jul. 24, 2012, now Pat. No. 9,405,613.

(51) Int. Cl.
*G06F 11/00* (2006.01)
*G06F 11/07* (2006.01)
*G06F 9/445* (2006.01)

(52) U.S. Cl.
CPC ............ *G06F 11/0793* (2013.01); *G06F 8/65* (2013.01); *G06F 11/0709* (2013.01); *G06F 11/079* (2013.01); *G06F 11/0736* (2013.01); *G06F 11/0751* (2013.01); *G06F 11/0769* (2013.01)

(58) Field of Classification Search
USPC .......................................................... 714/36
See application file for complete search history.

(56) References Cited

U.S. PATENT DOCUMENTS

| | | | |
|---|---|---|---|
| 6,314,455 B1 | 11/2001 | Cromer | |
| 8,055,892 B2 | 11/2011 | Reed | |
| 8,223,630 B2 | 7/2012 | Yasrebi et al. | |
| 8,549,345 B1 * | 10/2013 | Tripathi | H04L 69/16 714/4.1 |
| 2008/0209557 A1 | 8/2008 | Herley et al. | |

(Continued)

FOREIGN PATENT DOCUMENTS

| | | |
|---|---|---|
| CN | 101496025 A | 7/2009 |
| CN | 102542198 A | 7/2012 |
| TW | 200842716 | 11/2008 |

OTHER PUBLICATIONS

Intel, White Paper, 2nd Generation Intel Core i5 and i7 Processors, Advanced Security Design Aspects of Intel Active Management Technology (Intel AMT), 2011 (10 pages).

(Continued)

*Primary Examiner* — Sarai E Butler
(74) *Attorney, Agent, or Firm* — Trop, Pruner & Ju P.C.

(57) ABSTRACT

In some examples, fault of a code in an electronic device is detected. In response to detecting the fault, an update code is retrieved using a network stack from a network site over a network to update the code that has experienced the fault, during a state of the electronic device prior to completion of a boot procedure of the electronic device.

20 Claims, 3 Drawing Sheets

(56) References Cited

U.S. PATENT DOCUMENTS

| | | |
|---|---|---|
| 2008/0267075 A1 | 10/2008 | Mehrad et al. |
| 2009/0086620 A1* | 4/2009 | Fowler .............. H04L 12/40169 370/216 |
| 2009/0097397 A1 | 4/2009 | Moreira Sa De Souza |
| 2009/0113232 A1 | 4/2009 | Park et al. |
| 2010/0031361 A1 | 2/2010 | Shukla |
| 2010/0077481 A1 | 3/2010 | Polyakov et al. |
| 2010/0325495 A1* | 12/2010 | Talla ................... G06F 11/0712 714/49 |
| 2012/0144492 A1 | 6/2012 | Griffin et al. |
| 2012/0159235 A1* | 6/2012 | Suganthi ............. G06F 11/2028 714/4.11 |

OTHER PUBLICATIONS

International Search Report & Written Opinion received in related PCT Application No. PCT/US2012/047978, dated Feb. 7, 2013, 9 pages.

* cited by examiner

RECEIVING AN UPDATE CODE PRIOR TO COMPLETION OF A BOOT PROCEDURE

CROSS REFERENCE TO RELATED APPLICATIONS

This is a continuation of U.S. application Ser. No. 14/391,427, filed Oct. 9, 2014, which is a national stage application under 35 U.S.C. §371 of PCT/US2012/047978, filed Jul. 24, 2012, which are both hereby incorporated by reference in their entirety.

BACKGROUND

An electronic device can include various modules that include machine-readable instructions, such as a boot code (e.g. Basic Input/Output System code or Unified Extensible Firmware Interface (UEFI) code), an operating system, an application, and so forth. When a module in the electronic device exhibits a fault, the electronic device may cease to operate properly.

BRIEF DESCRIPTION OF THE DRAWINGS

Some embodiments are described with respect to the following figures.

DETAILED DESCRIPTION

Figure 1:
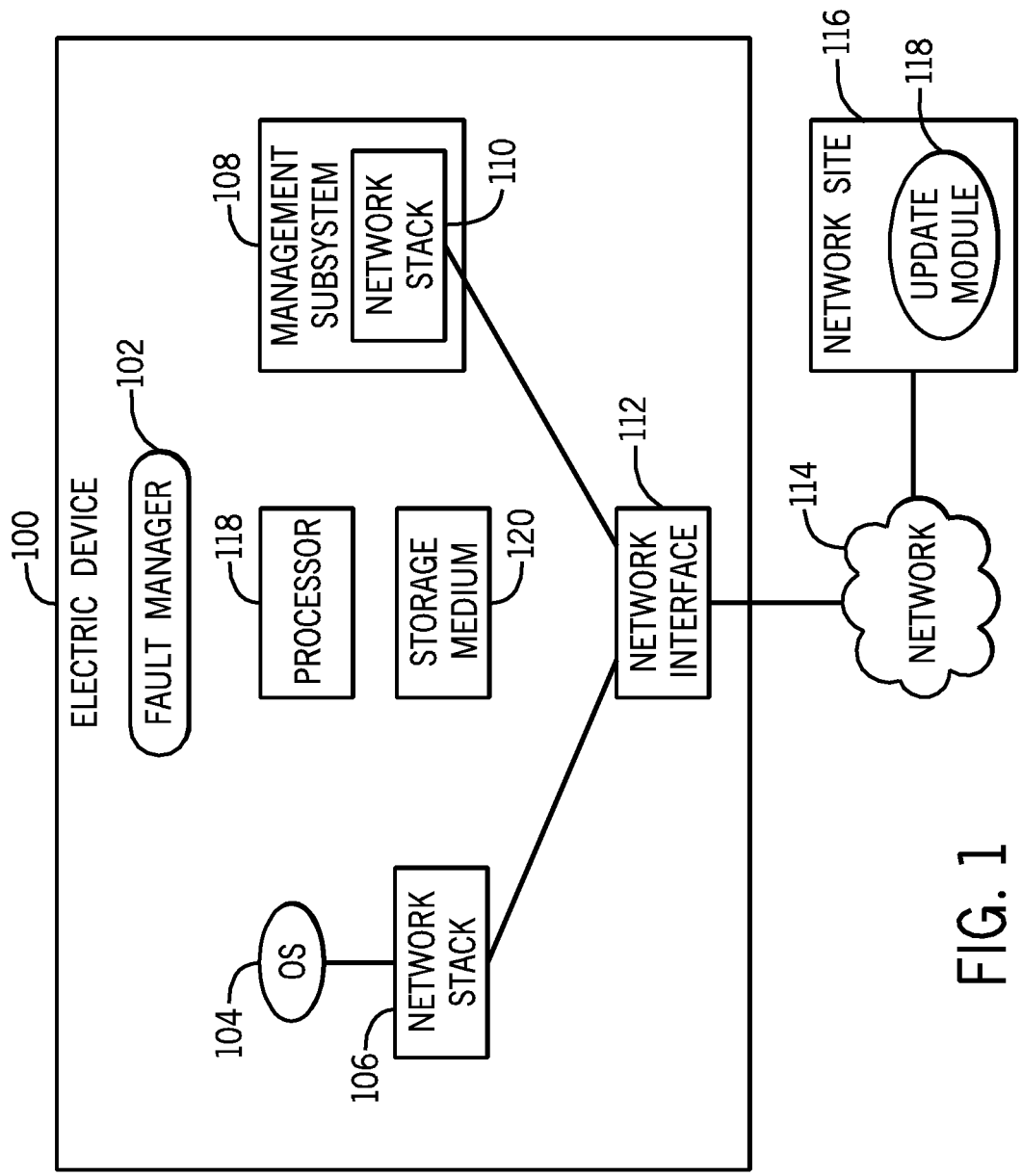
FIG. 1 is a block diagram of an electronic device that incorporates some implementations.

A module (including machine-readable instructions) in an electronic device can exhibit a fault due to various causes. In some examples, the fault can be due to corruption caused by malware (e.g. virus or other type of malicious code). A fault can also be caused by corruption in various data structures used by the module. There can be other causes of faults in a module.

Example modules in an electronic device can include any one or a combination of the following: a boot code (e.g. Basic Input/Output System (BIOS) code or Unified Extensible Firmware Interface (UEFI) code), an operating system, a device driver, an application, and so forth. Note that UEFI code is provided as a replacement for traditional BIOS code. In the ensuing discussion, reference to "BIOS code" is intended to refer to either traditional BIOS code or UEFI code. A fault in a module of the electronic device can cause malfunction of the electronic device, or may lead to reduced performance of the electronic device. For example, if the boot code or operating system of the electronic device were to crash, then the electronic device may no longer be useable, since the electronic device would not be able to start properly. As another example, if a device driver were to exhibit a fault, then access to a corresponding hardware device of the electronic device may no longer be possible. Failure of an application may lead to an inability of the user to use the application for performing desired tasks.

In response to a fault of a module, a user may attempt to update the faulty module (by either replacing the module or repairing the module) using an update module (update code) provided on a storage medium such as a hard disk drive, a Universal Serial Bus (USB) storage medium, or other removable medium. However, in cases where a storage medium that has an update module is not readily available, it can be difficult for the user to recover the faulty module.

In accordance with some implementations, rather than having to restore a faulty module using code on a storage medium, a preboot network stack of the electronic device can be used for retrieving, over a network, an update module for recovering the faulty module. The preboot network stack can be part of a management subsystem, where the preboot network stack is independent of a network stack that is associated with an operating system of the electronic device. A "network stack" can include network communication layers that allow communications over a network. A network can be a wired network, a wireless network, or a combination of wired and wireless networks.

Using the preboot network stack, retrieval of an update module can be performed in a preboot context of the electronic device. A preboot context refers to a state of the electronic device prior to completion of a boot procedure and prior to loading of an operating system. The boot procedure of an electronic device involves executing boot code (e.g. BIOS code), and loading the operating system of the electronic device. By being able to use the preboot network stack to retrieve an update module, the ability to recover a faulty module does not have to rely on proper operation of boot code or an operating system in the electronic device.

Although reference is made to a "preboot network stack," it is noted that such network stack, which is independent of the operating system-associated network stack, can also be used to perform communication (including communication to retrieve an update module) after booting of the electronic device has completed and the operating system has been loaded. Thus, a preboot network stack refers to a network stack that is capable of operating both in the preboot context and after successful booting of the electronic device and loading of the operating system.

FIG. 1 is a block diagram of an example electronic device 100 that includes a fault manager 102, an operating system (OS) 104, and a network stack 106 that is associated with the OS 104. In the ensuing discussion, the network stack 106 is referred to as an "OS-associated network stack". Although the network stack 106 is depicted as being outside of the OS 104, it is noted that the network stack 106 can be considered to be part of the OS 104 in some implementations.

The electronic device 100 further includes a management subsystem 108, which has another network stack 110 that is independent of the OS-associated network stack 106. This network stack 110 can be referred to as a preboot network stack as discussed above.

The management subsystem 108 is used for performing various management tasks with respect to the electronic device 100. By using the network stack 110 that is independent of the OS-associated network stack 106, the management subsystem 108 can perform its management tasks using out-of-band network connectivity. If the network connectivity associated with the OS 104 (using the OS-associated network stack 106) is considered the in-band network connectivity (in other words, this network connectivity is used for performing the normal operations of the electronic device that involve network communications), then the out-of-band network connectivity refers to a separate connectivity that can be maintained without involving the OS-associated network stack 106.

As further depicted in FIG. 1, the electronic device 100 includes a physical network interface 112, which can be a network interface card or some other type of physical network interface. Both the network stack 106 and network stack 110 can communicate through the physical network interface 112 over a network 114. Although just one physical network interface is depicted in FIG. 1, note that in alternative examples, multiple physical network interfaces can be present.

Examples of various management tasks that can be performed using the management subsystem 108 can include any one or combination of the following: transmitting information of the electronic device 100 in response to a query from a remote management server, downloading of malware signatures from the remote management server, power cycling the electronic device in response to a request from the remote management server, performing tasks to quarantine the electronic device upon detection of infection by viruses or other malware, and so forth.

In accordance with some implementations, the management subsystem 108 (and in particular the network stack 110 in the management subsystem 108) can also be used by the fault manager 102 for the purpose of obtaining an update module 118 from a remote network site 116 (which includes a server computer) for updating (or recovering) a faulty module in the electronic device 100. Updating (or recovering) a faulty module can refer to replacing or repairing the faulty module using the update module.

The fault manager 102 can detect a fault of a module (such as the OS 104 or some other module in the electronic device 100). In response to detecting the fault, the fault manager 102 can use the network stack 110 of the management subsystem 108 to access, over the network 114, the remote network site 116, for retrieving the update module 118 at the network site 116. The retrieved update module 118 can be used for recovering the faulty module in the electronic device 100.

The ability of the management subsystem 108 to perform network communications using its network stack 110 (which is independent of the OS-associated network stack 106), allows retrieval of the update module 118 over the network 114 even if the electronic device 100 cannot boot properly. In fact, the faulty module to be recovered can be the OS 104 or boot code.

The network stack 110 of the management subsystem 108 also provides greater flexibility since the network stack 110 does not have to rely upon use of a specific remote boot protocol, such as the Preboot Execution Environment (PXE) protocol. PXE communications can be restricted to communications between PXE clients and PXE servers within a secure network, such as a private network of an enterprise (e.g. business concern, educational organization, government agency, etc.).

In contrast, the network stack 110 of the management subsystem 108 supports communications in a greater variety of environments for the purpose of retrieving the update module 118 at the network site 116. The greater variety of environments can include an enterprise environment and a public environment (such as the world wide web).

The electronic device 100 further includes a processor (or multiple processors) 118, and a storage medium (or storage media) 120. The fault manager 102 and OS 104 are executable on the processor(s) 118. Although not shown, other modules in the electronic device 100 can also be executable on the processor(s) 118.

Figure 2:
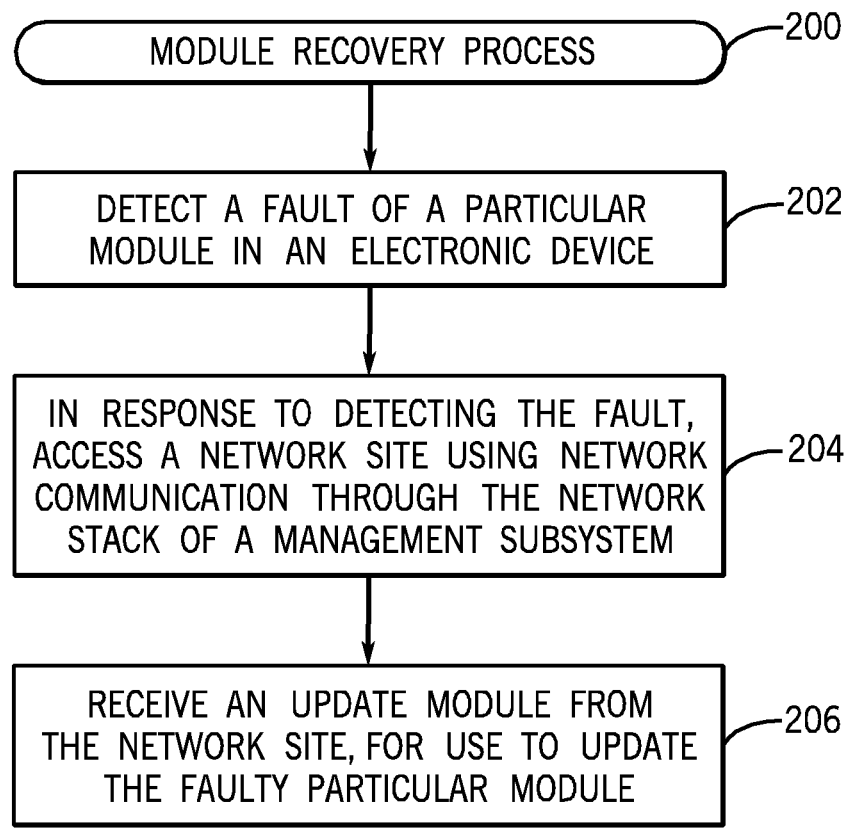
FIG. 2 is a flow diagram of a module recovery process, in accordance with some implementations.

FIG. 2 is a flow diagram of a module recovery process 200 according to some implementations. The process 200 can be performed by the fault manager 102, in some examples. The process 200 detects (at 202) a fault of a particular module in the electronic device 100. In some implementations, the detection of the fault can be performed within the electronic device 100 without input from any remote server. For example, the fault manager 102 can start a timer whenever the particular module is started—failure of the particular module to complete loading and execution within a predefined time interval of the timer is an indication of fault of the particular module. In other examples, a faulty module can issue an exception or other message that is received by the fault manager 102. Using techniques according to some implementations, remote server involvement does not have to be employed for performing fault detection of the particular module.

In response to detecting the fault, the process 200 accesses (at 204) the network site 116 using network communication through the network stack 110 of the management subsystem 108, which is independent of the OS-associated network stack 106. The access of the network site 116 using the network stack 110 of the management subsystem 108 can be performed in the preboot context. In response to the access, the process 200 receives (at 206) the update module 118 from the network site 116, which can be used to update the faulty particular module. Updating the faulty particular module includes replacing the particular module and/or repairing the particular module.

Figure 3:
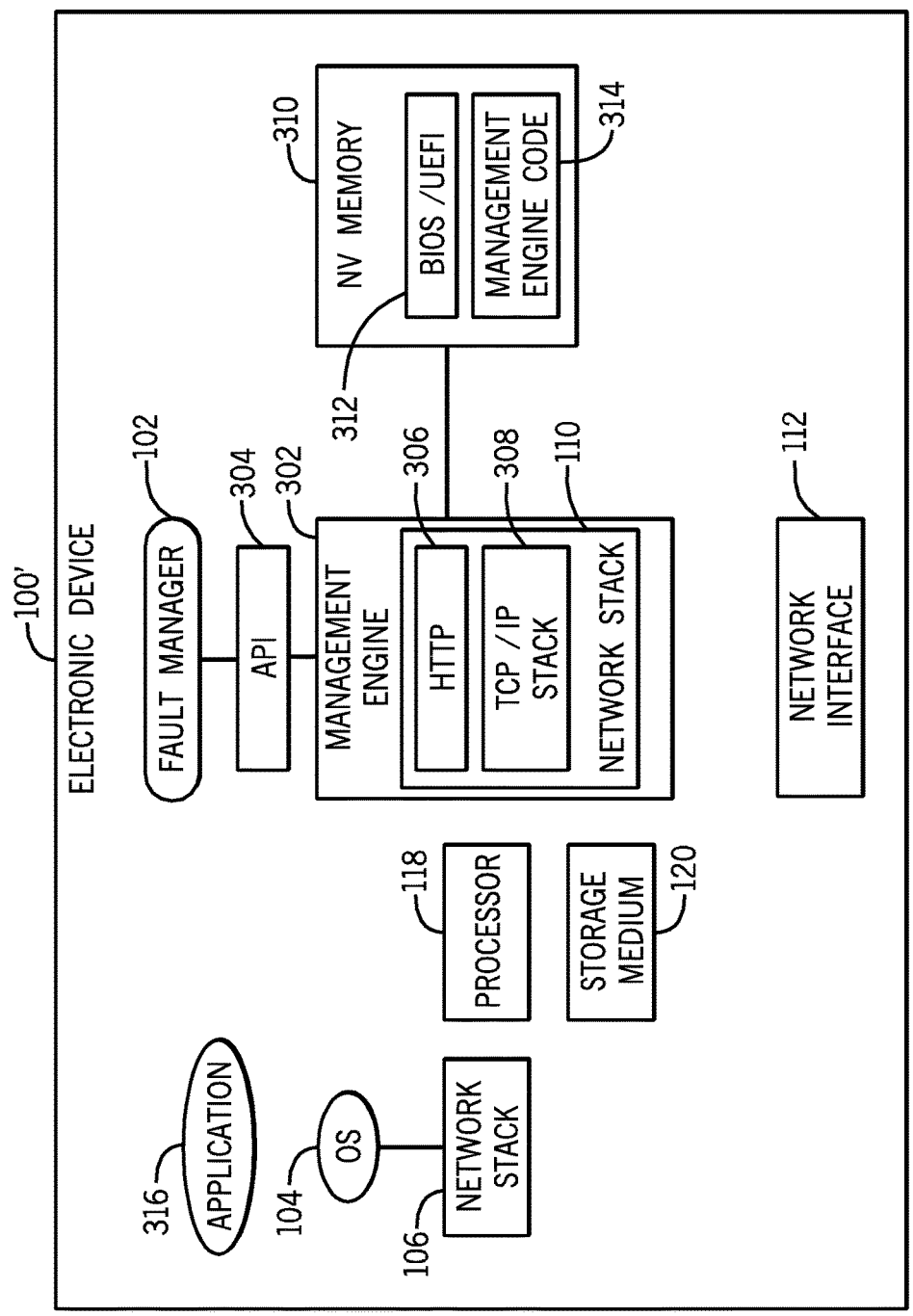
FIG. 3 is a block diagram of an electronic device according to further implementations.

FIG. 3 is a block diagram of an electronic device 100' according to alternative implementations. Components in the electronic device 100' that are the same as components of the electronic device 100 are assigned the same reference numerals.

The electronic device 100' includes a management engine 302, which can be implemented as an integrated circuit controller chip, such as an application specific integrated circuit (ASIC) chip, programmable gate array (PGA) chip, microcontroller, microprocessor, and so forth. The management engine 302 is an implementation of the management subsystem 108 of FIG. 1.

An application programming interface (API) 304, or some other type of interface, is provided to allow the fault manager 102 to access services of the management engine 302. In accordance with some implementations, a service that can be accessed by the fault manager 102 using the API 304 is the out-of-band network connectivity (including the network stack 110) supported by the management engine 302, which allows the fault manager 102 to retrieve an update module (e.g. 118 in FIG. 1) from the remote network site 116 without having to rely on the OS-associated network stack 106. The API 304 includes various functions or routines that can be called by the fault manager 102 for accessing the services of the management engine 302.

In FIG. 3, the network stack 110 in the management engine 302 has a Hypertext Transfer Protocol (HTTP) layer 306, which allows the management engine 302 to perform HTTP communications over a network, such as the network 114 of FIG. 1. HTTP defines various requests and responses that can be communicated by the HTTP layer 306. The HTTP requests can be used for obtaining information (such as the update module 118 in FIG. 1) from a network entity (such as a server computer at the network site 116). In other examples, instead of using HTTP, the network stack 110 can include a component according to another protocol for managing request-response communications (or other types of communications) over a network.

The network stack 110 further includes a Transmission Control Protocol/Internet Protocol (TCP/IP) stack 308, which has a TCP layer and an IP layer. An IP layer is used to communicate IP packets that have source and destination IP addresses to allow for the packets to be routed through a network to a destination. The TCP layer provides for reliable, ordered delivery of data between network entities.

It is noted that the OS-associated network stack 106 can include similar layers as the network stack 110 in the management engine 302.

The electronic device 100' also includes a non-volatile memory 310, such as flash memory or other type of memory. The non-volatile memory 310 can be used to store BIOS code 312 and management engine code 314. The BIOS code 312 can be considered firmware (which includes machine-readable instructions) that is executable by the processor(s) 118 of the electronic device 100', such as to perform boot tasks. In some examples, the fault manager 102 can be part of the BIOS code 312. In other examples, the fault manager 102 is separate from the BIOS code 312.

The management engine code 314 can also be considered firmware that is executable in the management engine 302. The management engine code 314 can provide various services that are offered by the management engine 302, such as services relating to management tasks that are performed by the management engine 302. In other examples, the management engine code 314 can be embedded in a non-volatile storage medium that is part of the management engine 302.

Machine-readable instructions of various modules described above (including the fault manager 102, OS 104, application 316, BIOS code 312, and management engine code 314 of FIG. 1 or 3) are loaded for execution on a processing circuit (such as the processor(s) 118 or management engine 102 in FIG. 1 or 3).

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An electronic device comprising:
   an operating system;
   a first network stack associated with the operating system;
   a second network stack;
   a processor;
   a storage medium storing instructions executable on the processor to:
   detect fault of a code in the electronic device,
   in response to detecting the fault, access a network site using network communication through the second network stack during a state of the electronic device prior to completion of a boot procedure of the electronic device, and
   in response to the access, receive an update code to update the code that has experienced the fault.

2. The electronic device of claim 1, wherein the instructions are executable on the processor to perform the detecting of the fault without input from any remote server.

3. The electronic device of claim 1, wherein the code that has experienced the fault includes code of the operating system.

4. The electronic device of claim 1, wherein the code that has experienced the fault includes boot code.

5. The electronic device of claim 1, wherein the code that has experienced the fault includes an application code or a device driver.

6. The electronic device of claim 1, further comprising a controller chip that includes the second network stack.

7. The electronic device of claim 1, wherein the second network stack has an Internet Protocol (IP) layer and Transmission Control Protocol (TCP) layer, the IP and TCP layers to perform the network communication to retrieve the update code.

8. The electronic device of claim 7, wherein the second network stack further includes a Hypertext Transfer Protocol (HTTP) layer to perform the network communication to retrieve the update code.

9. The electronic device of claim 1, further comprising an application programming interface to allow the instructions to access the second network stack.

10. The electronic device of claim 1, wherein the instructions are part of a Basic Input/Output System (BIOS) code.

11. A method comprising:
   detecting, in an electronic device, fault of a code; and
   in response to detecting the fault, retrieving, by the electronic device, an update code for updating the code that has experienced the fault, using a first network stack that is separate from a second network stack associated with an operating system in the electronic device, wherein the update code is retrieved using the first network stack from a network site over a network during a state of the electronic device prior to completion of a boot procedure of the electronic device.

12. The method of claim 11, wherein the update code is retrieved using the first network stack prior to loading of the operating system.

13. The method of claim 12, wherein retrieving the update code using the first network stack is performed without using the second network stack associated with the operating system.

14. The method of claim 11, further comprising:
   updating the code that has experienced the fault using the update code, wherein the updating includes replacing or repairing the code that has experienced the fault using the update code.

15. The method of claim 11, wherein the code that has experienced the fault is selected from among boot code and code of the operating system.

16. The method of claim 11, wherein the first network stack comprises a Hypertext Transfer Protocol (HTTP) layer that is separate from an HTTP layer of the second network stack.

17. The method of claim 11, wherein the detecting of the fault is performed without input from any remote server.

18. A non-transitory machine-readable storage medium storing instructions that upon execution cause an electronic device to:
    detect fault of a code; and
    in response to detecting the fault, retrieve an update code for updating the code that has experienced the fault, using a first network stack during a state of the electronic device prior to completion of a boot procedure of the electronic device, the first network stack being separate from a second network stack that is associated with an operating system in the electron device, wherein the update code is retrieved using the first network stack from a network site over a network prior to loading of the operating system in the electronic device.

19. The non-transitory machine-readable storage medium of claim 18, wherein the detecting of the fault is performed without input from any remote server.

20. The non-transitory machine-readable storage medium of claim 18, wherein the update code is retrieved using the first network stack during a state of the electronic device prior to completion of a boot procedure of the electronic device.

* * * * *

UNITED STATES PATENT AND TRADEMARK OFFICE
CERTIFICATE OF CORRECTION

PATENT NO. : 9,864,651 B2  
APPLICATION NO. : 15/204679  
DATED : January 9, 2018  
INVENTOR(S) : Liu et al.

Page 1 of 1

It is certified that error appears in the above-identified patent and that said Letters Patent is hereby corrected as shown below:

On the Title Page

In Column 2, item (74), Attorney, Agent, or Firm, delete "Ju P.C." and insert -- Hu P.C. --, therefor.

In the Claims

In Column 7, Claim 18, Line 17, delete "electron" and insert -- electronic --, therefor.

Signed and Sealed this  
Twenty-ninth Day of May, 2018

Andrei Iancu  
*Director of the United States Patent and Trademark Office*